United States Patent [19]

Kelsch, Jr.

[11] 4,102,200
[45] Jul. 25, 1978

[54] TEMPERATURE INDICATOR

[76] Inventor: Joseph R. Kelsch, Jr., 31 Sioux Dr., Commack, N.Y. 11725

[21] Appl. No.: 738,376

[22] Filed: Nov. 2, 1976

[51] Int. Cl.² .............................................. G01K 1/02
[52] U.S. Cl. ................................... 73/371; 116/114 Y
[58] Field of Search ................ 73/1 F, 323, 329, 356, 73/371, 374, 385, 427, 428, 1 H, 375, 376, 377, 378; 116/114 B, 114 Y, 129 K, DIG. 3

[56] References Cited

U.S. PATENT DOCUMENTS

| 562,679 | 6/1896 | Traut et al. | 73/323 X |
| 1,152,153 | 8/1915 | Dietz | 73/371 |
| 1,723,390 | 8/1929 | Tingley | 73/431 X |
| 1,812,680 | 6/1931 | Boyce | 73/376 X |
| 2,015,997 | 10/1935 | Fee, Jr. | 73/428 X |
| 2,201,186 | 5/1940 | Lane | 73/376 |
| 2,937,525 | 5/1960 | Snyder | 73/377 |
| 3,038,097 | 6/1962 | Graffenried | 73/371 X |
| 3,373,611 | 3/1968 | Trott | 73/352 |
| 3,518,884 | 7/1970 | Wood, Jr. | 73/374 |
| 3,636,769 | 1/1972 | Chaney | 73/371 |

Primary Examiner—S. Clement Swisher
Attorney, Agent, or Firm—Richard L. Miller

[57] ABSTRACT

A luminescent tube filled with a temperature responsive liquid which causes the tube to glow as the liquid moves up and down the tube is encased within an opaque expansible sleeve which is aligned with graduations on the tube to indicate a critical temperature to be sensed when the tube is mounted on an object, so that if the tube glows above the sleeve the temperature is readily discernable. The tube and sleeve may be permanently mounted on the object or removably mounted by a magnet or clip on the sleeve.

6 Claims, 3 Drawing Figures

TEMPERATURE INDICATOR

BACKGROUND OF THE INVENTION

This invention relates to an industrial temperature indicator constructed so as to be easily visible under daylight or night operating conditions to detect a change in the operating temperature of a mechanical device.

A temperature indicator of this nature finds use in heating and air conditioning ducts of office buildings to spot insufficient cooling or heating or can be permanently installed on a motor housing to determine overheating, etc.

SUMMARY OF THE INVENTION

In accordance with the invention, a conventional electro-luminescent temperature indicator tube is mounted in an expansible shield. The shield is slid along the graduated tube to a desired "critical" temperature which when sensed will indicate that a mechanical device is overheating or that the device is operating properly. The shield and tube may be attached to the device permanently, by a magnet, or a clip. If the indicator glow is visible above the shield, the "critical" temperature is immediately discernable.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
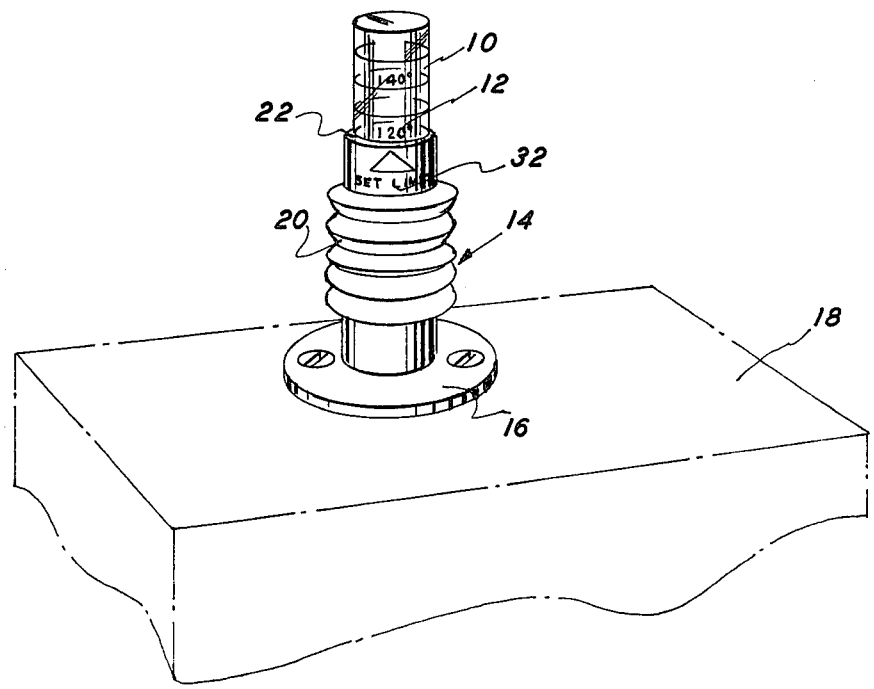
FIG. 1 is a perspective view of the temperature indicator of the present invention permanently mounted on a mechanical device.

Referring now to the drawing in detail, wherein like numerals indicate like elements throughout the several views, a conventional electro-luminescent indicator tube 10 made of clear glass coated with electro-luminescent particles and filled with a conductive temperature-responsive liquid which will rise in tube 10 upon an increase in temperature is provided. Tube 10 is calibrated and graduated in degrees as indicated by indicia 12. The particular details of construction of tube 10 is not part of the present invention, but may be found in U.S. Pat. No. 3,038,097, which disclosure is incorporated herein by reference.

Tube 10 may be encased in an expansible, bellows-type opaque shield 14 having a base 16 fixed by suitable fasteners to a mechanical device such as a motor housing 18 to sense the temperature of the motor in housing 18. Shield 14 includes the expansible sleeve 20 which is slid along the graduated tube 10 so that the top edge 22 of sleeve 20 is aligned with a desired graduated indicia 12 which will indicate, for example, that the motor in housing 18 is overheating. The indicator tube 10 is then checked periodically to see if it is glowing above edge 22, which will indicate immediately whether the mechanical device is operating properly.

Figure 2:
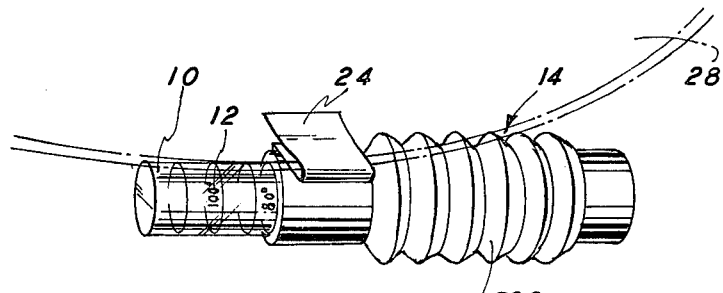
FIG. 2 is a perspective view of another form of the indicator removably clipped to a mechanical device.
Figure 3:
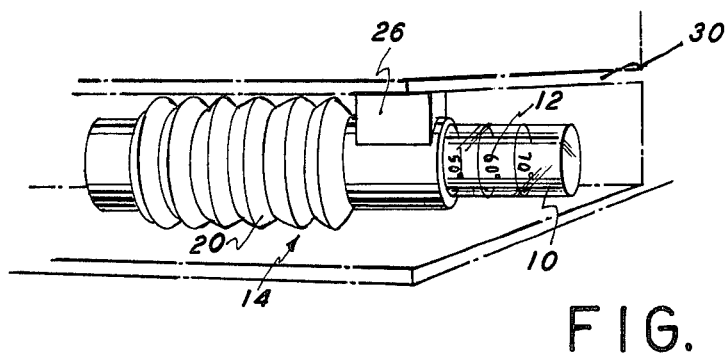
FIG. 3 is a perspective view of still another form of the indicator removably mounted by a magnet on a mechanical device.

Sleeve 20 may also include a clip 24 (FIG. 2) or a magnet 26 (FIG. 3) to attach the temperature indicator unit to a blade-like structure 28 or any galvanized metal or steel surface 30, respectively. Sleeve 20 may also be provided with indicia 32 to indicate the manner of use of sleeve 20.

While a specific embodiment of a temperature indicator has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A temperature indicator comprising: a graduated electro-luminescent tube which glows along a length in accordance with the movement of temperature-responsive liquid up and down the tube, an opaque expansible sleeve encasing said tube whereby the top edge of said sleeve is alignable with a graduation on said tube with the sleeve covering the entire tube below said graduation, and means connected to said sleeve for mounting said sleeve and tube on an object, the temperature of which is to be sensed.

2. A temperature indicator comprising: a graduated electro-luminescent tube which glows along a length in accordance with the movement of temperature-responsive liquid up and down the tube, an opaque expansible sleeve encasing said tube, the top edge of said sleeve being alignable with a graduation on said tube, and means connected to said sleeve for mounting said sleeve and tube on an object, the temperature of which is to be sensed and wherein said sleeve has a bellows-like configuration enabling it to be expanded and compressed.

3. The indicator of claim 2 wherein said mounting means includes a base on said sleeve adapted to be mounted by fasteners on an object.

4. The indicator of claim 2 wherein said mounting means is a magnet.

5. The indicator of claim 2 wherein said mounting means is a clip.

6. The indicator of claim 2 wherein said sleeve includes indicia adjacent its top edge to indicate the direction in which said sleeve may be moved.

* * * * *